Oct. 27, 1959 — L. A. YODER — 2,910,338
METHOD OF FABRICATING ELECTRON DISCHARGE DEVICES
Filed June 9, 1954
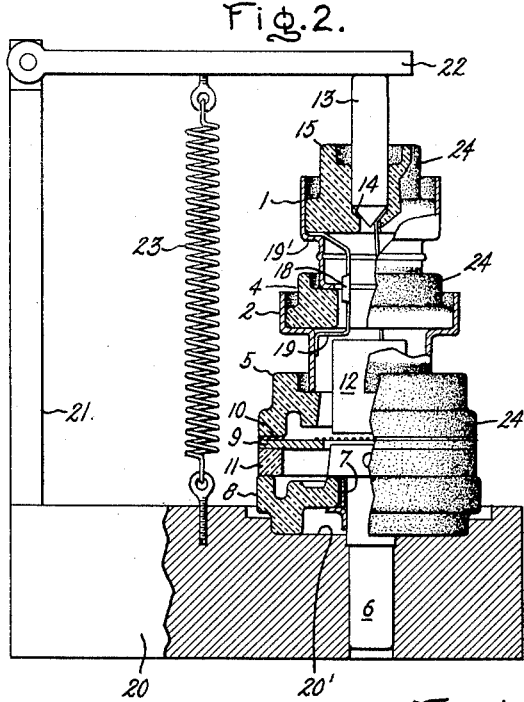
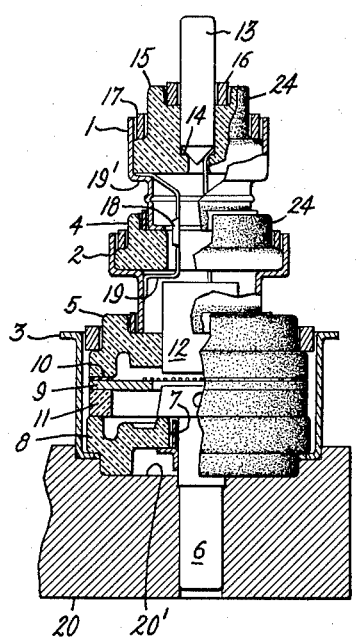
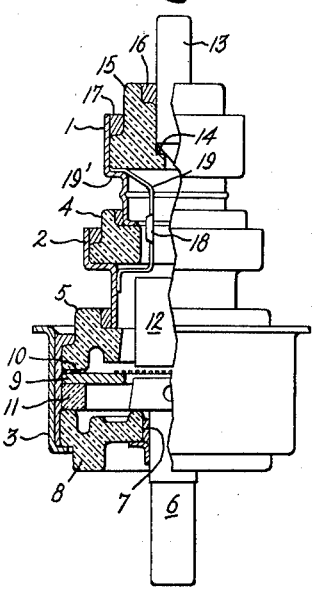
Inventor:
Lewis A. Yoder,
by Nathan [signature]
His Attorney.

United States Patent Office 2,910,338
Patented Oct. 27, 1959

2,910,338

METHOD OF FABRICATING ELECTRON DISCHARGE DEVICES

Lewis A. Yoder, Esperance, N.Y., assignor to General Electric Company, a corporation of New York Application June 9, 1954, Serial No. 435,469

1 Claim. (Cl. 316—19)

My invention relates to the fabrication of electron tubes and more particularly to a process for obtaining precise spacing and alignment of the electrodes of such tubes.

In electron tubes employed in the ultra-high frequency range, interelectrode distances must be uniformly maintained from device to device. For example, in one such tube, which is fabricated in accordance with this invention, the grid-cathode spacing is in the order of 0.0005 inch. It is thus necessary that in the fabrication of such devices, the components be accurately located both as to spacing and alignment and it is further necessary that such components or parts be clean, i.e., free from dust and metal particles.

A principal object of my invention is to provide an improved method of fabricating electron discharge devices by which such accuracy may be readily maintained.

Another object of my invention is to provide an improved method of electron tube fabrication by which the electrodes may be maintained free from dust or other undesirable particles after assembly thereof until final sealing of the tube.

In accordance with the teachings of this invention, the electrodes are assembled in their desired locations and are temporarily bonded in this position. During the sealing together of the parts making up the tube envelope, the temporary bond is removed leaving the tube components in the desired locations and positions. Since this permanent bonding together of the parts is usually accomplished in a furnace at a very high temperature, such, for example, as 1000° centigrade, this procedure in addition to maintaining the parts dirt free simplifies handling of the sub assembly prior to and during the permanent bonding operation.

For further objects and advantages and for a better understanding of my invention attention is now directed to the following description and accompanying drawing, and those features which I desire to protect herein are pointed out with particularity in the appended claim. In the drawing:

Fig. 1 is an elevational view partly in longitudinal cross section of a three element electron tube constructed in accordance with this invention; and Figs. 2 and 3 are similar views illustrating successive steps in the process of fabricating the tube of Fig. 1.

Referring particularly to Fig. 1, an electron discharge device is there illustrated that includes three metal members 1, 2, and 3, which may be of generally cylindrical form, as shown, and of respective diameters such that the diameter of member 2 is greater than that of member 1, and the diameter of member 3 is greater than that of member 2. The members 1, 2, and 3 are arranged in coaxially aligned spaced relationship and separated from one another by insulating cylinders 4 and 5, cylinder 4 being arranged to join members 1 and 2 while cylinder 5 similarly joins members 2 and 3. Members 1, 2 and 3 can be hermetically sealed to cylinders 4 and 5 by any suitable sealing technique known to those skilled in the art. Inasmuch as the metal members 1, 2, and 3, and the cylinders 4 and 5 are of progressively decreasing diameters from one end to the other, the tube as a whole has a step-wise configuration. An anode 6 is the form of a cylinder extends through a central opening 7 in an annular insulating disk 8 which spaces the anode from member 3 and provides an anode cap for the device. A grid 9 in the form of a plane metallic washer having a foraminated aperture centrally located therein contacts an annular insulating spacer 10, which, in turn, is juxtaposed on an annular surface provided on cylinder 5. An annular spacer 11 separates grid 9 from disk 8 and, consequently, locates anode 6 with respect to grid 9.

A cathode assembly 12, which may be of any convenient conventional type of indirectly heated cathode is cooperatively located and mounted with respect to the grid 9 and anode 6 within a central opening in cylinder 5 and is fastened thereto. A cylindrical heater terminal 13 abuts against a shoulder 14 extending inwardly from a central aperture in a cathode end cap 15 and is thus held in spaced relation with member 1. The inner portions of the tube are sealed from the atmosphere by means of seals located between the various parts which make up the envelope of the tube. By way of example, an annular seal 16, is provided between terminal 13 and cap 15, and a similar seal is shown at 17 between member 1 and cap 15. Similar seals are provided between the other enclosure components. Such seals are well known, and any suitable type depending upon the materials selected for the conducting and insulating parts of the tube may be used. Where the metallic members are copper, copper plated or copper clad, and the insulating members are ceramic, one suitable material is lead. Also in the embodiment shown, annular recesses are provided between the metal members and the insulating cylinders such that the sealing material is held in the desired location during the period while it is in a fluid state. In a sense these recesses serve as molds into which the sealing material is cast.

A getter 18 is supported on a filamentary conducting member 19 which is fastened at one extremity thereof to member 2 as by brazing, soldering, or by any other suitable means, and is supported at its other extremity between member 1 and cap 15.

It may be seen that if the electron tube components hereinbefore described are held in proper alignment and in the proper relative positions during the final sealing, such, for example, as the melting of the seals and the subsequent solidifying, the components will be properly positioned in the final tube. In order to maintain the hereinbefore mentioned high degree of accuracy in a manner consistent with the requirements of quantity production methods, the present invention provides a procedure as illustrated in Figs. 2 and 3.

In Figs. 2 and 3 are shown certain tube components which correspond to various parts illustrated in Fig. 1 and which are similarly numbered. These include particularly the enclosure forming parts 1 to 5 and end caps 8 and 15 as well as terminals 6 and 13.

The various parts of the device which were recited with particularity in connection with the description of the tube illustrated in Fig. 1 are shown assembled in the relationship they are intended to assume in the finished device. With devices of this type the major parts are assembled by contiguous stacking one upon the other. These parts are mounted upon a fabricating jig having a base 20, an upright member 21 supported on the base, and an arm 22 pivotally mounted on member 21. A tension spring 23 is connected between arm 22 and base 20 to bias said arm toward the base. A recess 20' having a surface corresponding to the shape of the anode end of the tube is provided in base 20. As shown, a portion of arm 22 near the free end thereof bears upon heater terminal 13 which in turn bears upon the inwardly extending shoulder 14 on cap 15.

Prior to inserting the assembled parts in the jig fixture, the end of support member 19 is placed between a shoulder 19' of member 1 and the inner end surface of cap 15, and a temporary binder is affixed to the places of abutment. A compressive force is then applied to the stacked parts by the fixture to maintain them in the desired position. At this point in the assembly process no permanent joints exist between the parts making up the enclosure of the tube, but some of the inner components, such, for example, as the cathode support structure are preferably secured to the envelope parts. In devices of this type, the electrodes are mounted on and held in alignment by the envelope parts which perform the function of supporting the electrodes as well as enclosing the inner tube space to separate it from the atmosphere.

While the subassembly is held in the fixture as indicated in Fig. 2, a temporary binder 24, in the fluid state, is placed across the points of abutment between the enclosure parts and allowed to harden. Following the solidifying of the binder, the subassembly may be removed from the jig without the parts becoming disassembled. The inner portions of the tube are effectively kept free from dirt and the tube may be handled freely.

Metal ring 3 is then placed around the anode end of the device, as shown in Fig. 3, and annularly shaped pieces of sealing material such as rings 16 and 17 are placed in the recesses provided between the parts to be sealed. During the exhausting operation, the sealing material is melted and the binder is removed as by decomposition, evaporation or both. When the temperature of the tube components is reduced, as by removing the tube from a furnace, the sealing material solidifies thus holding the parts in position.

In actual practice it is preferable to employ a temporary binder which hardens at room temperature and evaporates at a temperature less than the temperature used during the normal exhaust operation. In this way the temporary binder may be evaporated off during the exhausting of the tube. It is generally at this time that the seals between the enclosure parts are also made. Resin binders may be employed provided the pyrolysis products therefrom are not detrimental to the operation of the tube. One particular resin which has proven extremely satisfactory as a temporary binder is isobutyl methacrylate. Other materials which may be employed are nitro cellulose, cellulose acetate or metal cellulose.

While I have described my invention by taking various procedural steps in a particular order and in connection with a particular type tube, I do not intend to so limit my invention, and in the appended claim I aim to cover all equivalent variations as come within the true spirit and scope of the foregoing disclosure.

What I claim as new and desire to secure by Letters Patent of the United States is:

A method of fabricating an exhausted envelope structure comprising a plurality of annular components, which method comprising stacking said components in an aligned manner, temporarily sealing said envelope with a binder material capable of substantially completely vaporizing at elevated temperatures and which extends between abutting external surface portions of adjacent components so that said components are held in stacked aligned relation, then applying a permanent binder material between said components, and thereafter exhausting the temporarily sealed envelope structure at a temperature above the vaporizing point of said temporary binder material, whereby said temporary binder material is evaporated and removed from said envelope structure and said permanent binder material is caused to flow for permanently sealing said components upon subsequent cooling.

References Cited in the file of this patent

UNITED STATES PATENTS

| | | |
|---|---|---|
| 2,158,845 | Ayer | May 16, 1939 |
| 2,402,119 | Beggs | June 18, 1946 |
| 2,413,731 | Samuel | Jan. 7, 1947 |
| 2,415,412 | Buchwald et al. | Feb. 11, 1947 |
| 2,792,271 | Beggs | May 14, 1957 |